United States Patent
Oren et al.

(10) Patent No.: US 12,535,035 B2
(45) Date of Patent: Jan. 27, 2026

(54) MULTI-RING SPACER FOR GAS TURBINE ENGINE ROTOR STACK ASSEMBLY

(71) Applicant: Raytheon Technologies Corporation, Farmington, CT (US)

(72) Inventors: Nicholas Waters Oren, Marlborough, CT (US); Steven D. Porter, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 634 days.

(21) Appl. No.: 16/929,220

(22) Filed: Jul. 15, 2020

(65) Prior Publication Data

US 2022/0018285 A1    Jan. 20, 2022

(51) Int. Cl.
 *F01D 5/02*     (2006.01)
 *F02C 7/06*     (2006.01)
 *F02K 3/06*     (2006.01)

(52) U.S. Cl.
 CPC ............... *F02C 7/06* (2013.01); *F01D 5/027* (2013.01); *F02K 3/06* (2013.01)

(58) Field of Classification Search
 CPC .......... F01D 5/026; F01D 5/027; F01D 5/066; F04D 29/044; F04D 29/054; F04D 29/662; F05D 2230/644; F16B 43/009; B62D 17/00
 USPC ........................................ 280/86.751, 86.753
 See application file for complete search history.

(56) References Cited

U.S. PATENT DOCUMENTS

| | | | | |
|---|---|---|---|---|
| 4,901,523 A * | 2/1990 | Huelster | ................ | F01D 5/026 416/198 A |
| 5,192,142 A * | 3/1993 | Hyll | .................... | F04D 29/628 403/26 |
| 5,292,138 A | 3/1994 | Glynn et al. | | |
| 6,341,419 B1 | 1/2002 | Forrester et al. | | |
| 7,452,188 B2 * | 11/2008 | Bouchard | ............... | F01D 5/066 416/204 R |
| 7,510,380 B2 * | 3/2009 | Alam | ...................... | F01D 5/027 416/244 R |
| 7,912,587 B2 * | 3/2011 | Walters | .................. | F01D 5/027 73/66 |
| 8,918,974 B2 * | 12/2014 | Merrill | .................... | B60B 35/04 301/124.1 |
| 8,939,710 B2 | 1/2015 | Webb | | |

(Continued)

FOREIGN PATENT DOCUMENTS

| | | |
|---|---|---|
| CN | 107895077 B | 3/2020 |
| EP | 2019185 A2 | 1/2009 |

(Continued)

OTHER PUBLICATIONS

Translation of CN 107895077 A (Apr. 10, 2018) from FIT database (Year: 2018).*

(Continued)

*Primary Examiner* — Christopher R Legendre

(74) *Attorney, Agent, or Firm* — Carlson, Gaskey & Olds, P.C.

(57) ABSTRACT

A multi-ring spacer includes a first ring having a first clocking position, a second ring coaxial with the first ring, and having a second clocking position. A total kink angle of the multi ring spacer is dependent on an angular deviation of the second ring's clocking position relative to the first ring's clocking position.

6 Claims, 3 Drawing Sheets

(56) References Cited

U.S. PATENT DOCUMENTS

| | | |
|---|---|---|
| 9,932,832 B2 | 4/2018 | Wang et al. |
| 10,907,476 B2 * | 2/2021 | Cooper ..................... F02K 3/06 |
| 2007/0009360 A1 | 1/2007 | Alam et al. |
| 2012/0107098 A1 * | 5/2012 | Tirone, III .............. F01D 5/066 |
| | | 415/122.1 |
| 2015/0345294 A1 | 12/2015 | Wang et al. |
| 2022/0018285 A1 * | 1/2022 | Oren ....................... F01D 5/027 |

FOREIGN PATENT DOCUMENTS

| | | | |
|---|---|---|---|
| EP | 2075407 A2 | | 7/2009 |
| GB | 841715 A | * | 7/1960 |

OTHER PUBLICATIONS

European Search Report for European Patent Application No. 21185941.8 completed on Nov. 10, 2021.

* cited by examiner

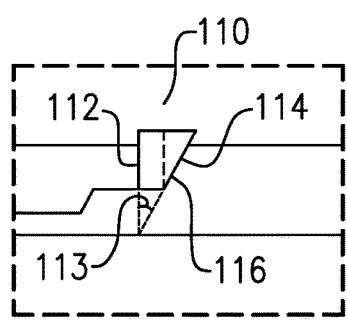
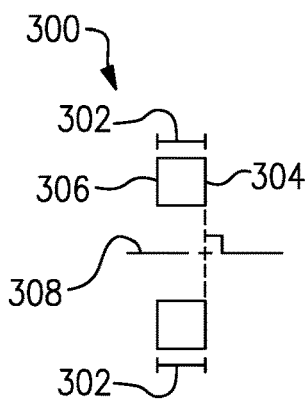
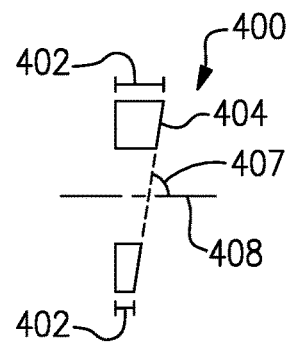
FIG.3  FIG.4  FIG.5
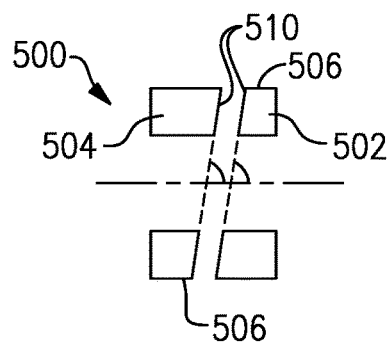
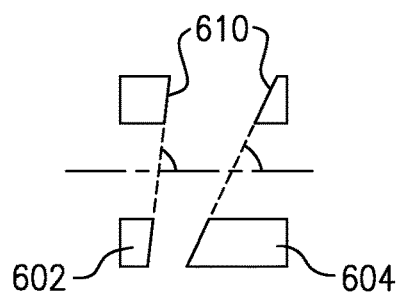
FIG.6  FIG.8
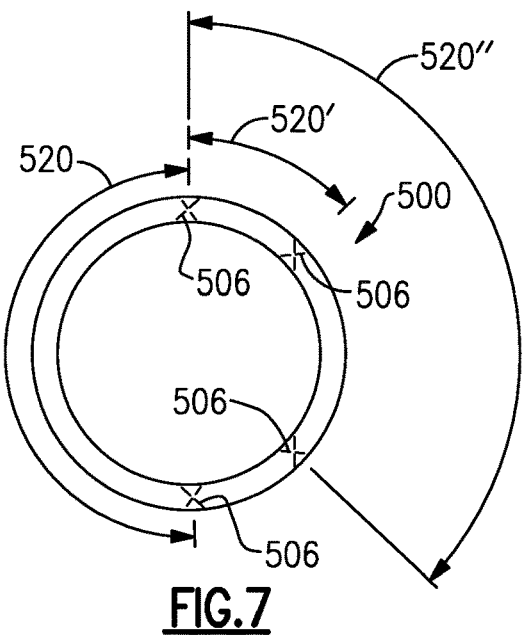
FIG.7

MULTI-RING SPACER FOR GAS TURBINE ENGINE ROTOR STACK ASSEMBLY

TECHNICAL FIELD

The present disclosure relates generally to gas turbine engine structures, and more specifically to a multi-ring rotor stack spacer for a gas turbine engine assembly.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine.

Within the compressor and turbine portions of the gas turbine engine are multiple rotors constructed together as a rotor assembly. The rotors within any given rotor assembly are spaced apart using classified spacers (i.e. multiple spacers having distinct classes of thickness) in order to achieve a desired axial length of the compressor or turbine rotor assembly. The classified spacers include varying average axial thicknesses and varying out of square angles due to manufacturing variations. The varying thicknesses and angles either mitigate rotor stack angles or contribute to rotor stack angles depending on the as-manufactured tolerances of the specific engine in which the classified spacers are included.

SUMMARY OF THE INVENTION

In one exemplary embodiment a multi-ring spacer includes a first ring having a first clocking position, a second ring coaxial with the first ring, and having a second clocking position, wherein a total kink angle of the multi ring spacer is dependent on an angular deviation of the second ring's clocking position relative to the first ring's clocking position.

In another example of the above described multi-ring spacer the total kink angle is maximized at an angular deviation of 0 degrees, and the total kink angle is minimized at an angular deviation of 180 degrees.

In another example of any of the above described multi-ring spacers each of the first ring and the second ring have an identical average axial length, relative to a shared axis.

In another example of any of the above described multi-ring spacers each of the first ring and the second ring have distinct average axial lengths.

In another example of any of the above described multi-ring spacers the first ring comprises a first kink angle having a first grade, and the second ring comprises a second kink angle having a second grade.

In another example of any of the above described multi-ring spacers the first grade and the second grade are identical.

In another example of any of the above described multi-ring spacers the first grade and the second grade are different.

In another example of any of the above described multi-ring spacers a first axial facing surface of the first ring has the first kink angle, a second axial facing surface of the second ring has the second kink angle, and the first axial facing surface and the second axial facing surface face each other.

Another example of any of the above described multi-ring spacers further includes a third ring coaxial with the first and second ring, the third ring having a consistent axial length.

An exemplary method for assembling a gas turbine engine includes defining a gap at an interface between a first and second co-rotating component, measuring an average axial length of the gap and measuring a kink angle of the gap, selecting a multi-ring spacer having a first ring and a second ring, the first ring having a first clocking position, the second having a second clocking position and being coaxial with the first ring, wherein a total kink angle of the multi-ring spacer is dependent on an angular deviation of the clocking position of the second ring's relative to the clocking position of the first ring, and matching a kink angle of the multi-ring spacer with the kink of the gap such that the kink angle of the gap is offset by rotating the second ring relative to the first ring.

In another example of the above described method for assembling a gas turbine engine the first and second co-rotating components include at least one rotor stack assembly.

In another example of any of the above described methods for assembling a gas turbine engine the first and second co-rotating components include two co-rotating rotor stack assemblies.

Another example of any of the above described methods for assembling a gas turbine engine further includes matching an axial length of the gap by selecting a nominal spacer ring having a consistent axial length and installing the nominal spacer ring coaxial with the first and second spacer rings.

In another example of any of the above described methods for assembling a gas turbine engine matching the kink angle of the multi-ring spacer with the kink angle of the gap includes matching a combined kink angle of the gap and the nominal spacer ring.

In another example of any of the above described methods for assembling a gas turbine engine the first ring and the second ring are identical.

In another example of any of the above described methods for assembling a gas turbine engine grades of a kink angle of an out of square surface of a first ring and a grade of a kink angle of an out of square surface of a second ring are distinct.

In one exemplary embodiment a multi-ring spacer includes a first ring defining an axis and including a first axially facing out of square surface having a first kink angle, a second ring, coaxial with the first ring, and including a second axially facing out of square surface having a second kink angle, and each of the first ring and the second ring including a clocked position corresponding to an axially thinnest radial position, and wherein a total kink angle of the multi-ring spacer is maximized when the clocking positions have 0 angular offset.

Another example of the above described multi-ring spacer further includes a third ring coaxial with the first ring, the third ring lacking an out of square surface.

In another example of any of the above described multi-ring spacers the first axially facing out of square surface and the second axially facing out of square surface have identical grades of kink angles.

In another example of any of the above described multi-ring spacers the first axially facing out of square surface and the second axial facing out of square surface have distinct grades of kink angles.

These and other features of the present invention can be best understood from the following specification and drawings, the following of which is a brief description.

BRIEF DESCRIPTION OF THE DRAWINGS

FIG. 3 schematically illustrates a zoomed in view of the rotor stack assembly spacer of FIG. 2.

FIG. 4 schematically illustrates an exemplary nominal rotor stack assembly spacer ring.

FIG. 5 schematically illustrates an exemplary angled rotor stack assembly spacer ring.

FIG. 6 schematically illustrates an exemplary rotor stack assembly spacer including two spacer rings.

FIG. 7 schematically illustrates a front view of the exemplary rotor stack assembly spacer of FIG. 6.

FIG. 8 schematically illustrates a variation on the rotor stack assembly of FIG. 6.

DETAILED DESCRIPTION

Figure 1:
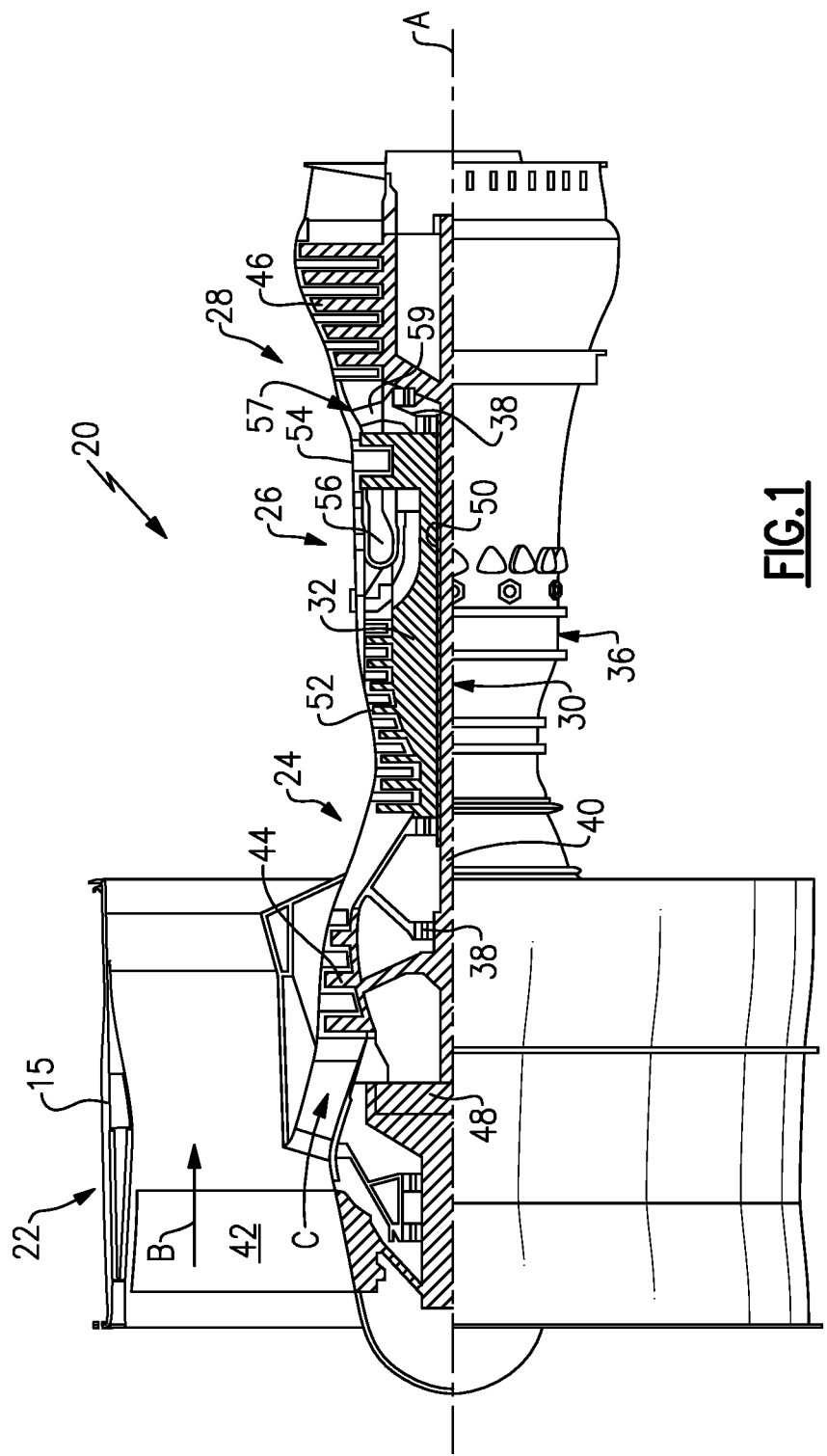
FIG. 1 illustrates a high level schematic view of an exemplary gas turbine engine according to one embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
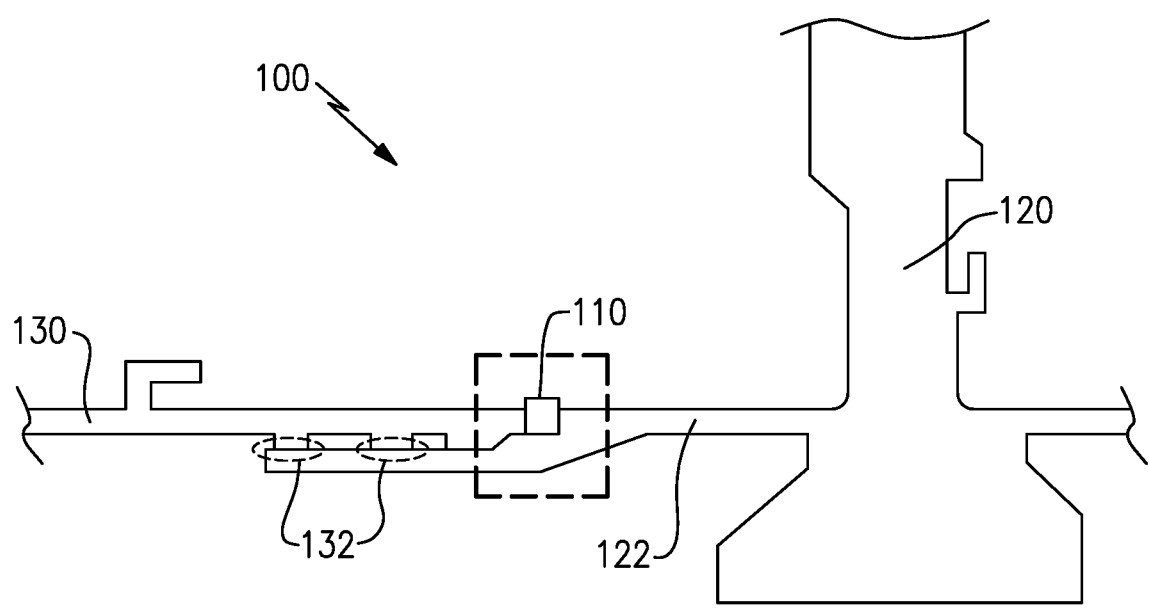
FIG. 2 schematically illustrates a partial rotor stack assembly including a rotor stack assembly spacer.

With continued reference to FIG. 1, FIG. 2 schematically illustrates a partial rotor stack assembly 100 including a rotor stack assembly spacer 110 and a corresponding rotor 120 in the rotor stack assembly 100. The rotor 120 includes a rotor arm 122 that extends axially (relative to an engine 20 axis). The rotor arm 122 is sealed to a corresponding rotor assembly arm 130 via contact seals 132. In order to properly position the rotor 120 axially, and to compensate for any out of square angle included within the as-manufactured engine, the rotor stack assembly spacer 110 is positioned between facing surfaces of the rotor assembly arm 130 and the rotor arm 120. As used herein, as-manufactured refers to the actual manufactured dimensions of the engine components. In contrast "nominal" refers to the designed specifications of the engine components and does not account for tolerances or other manufacturing variations that may impact the as-manufactured dimensions.

Existing systems utilize individual spacer rings that are manufactured to a nominal design and then measured to determine the as manufactured average thickness and out of square angle of the spacer. The measured as manufactured dimensions are then used to classify (i.e. categorize) the spacers. When a new engine is constructed, the as manufactured engine is measured and a "best fit" spacer is selected from the classified spacers. The best fit spacer is the spacer that best matches the out of square angle and spacing requirements of the as-manufactured rotor assembly.

With continued reference to FIG. 2, FIG. 3 schematically illustrates a zoomed in view of the spacer 110 according to one example. A nominal spacer 110 (i.e. a spacer with no variation from the design specification) would include surfaces 112, 114 aligned with the radius of the engine. The surfaces 112, 114 aligned with the radius of the engine are normal to the axis of the engine. The normality of the surface, relative to the axis of the engine is referred to as being square with the engine. Due to the manufacturing variance, however, the slot for including the spacer includes an angled surface 116 that is out of square with the axis of the engine. The angle by which the surface 112, 114 is out of square is referred to herein as the "kink". The total kink angle 113 of a multi ring spacer refers to the angle by which axial ends of the multi ring spacer are out of square. The total kink angle 113 is illustrated via dashed lines extending the axial ends of the spacers 112, 114 to a meeting point. The dashed lines do not represent physical structure, and are present solely to illustrate the total kink angle 113. The particular angle of the kink is highly exaggerated in the illustration to demonstrate the concept. In one practical example, the grade can be within the range of 0.000 inches to 0.002 inches (0.051 mm) across the face such that the axially longest portion is less than or equal to 0.002 inches (0.0051 mm) longer than the axially shortest portion. The spacer 110 in the illustrated example utilizes two spacer rings, with the rings being able to be rotated relative to each other during installation. Rotating the rings relative to each other alters the kink of the combined spacer 110, allowing any spacer 110 to be precisely matched to a kink of an as-manufactured engine without requiring a best fit match.

With continued reference to FIGS. 2 and 3, and with like numerals indicating like elements, FIGS. 4 and 5 illustrate exemplary rings that can be used to create the multi-ring spacer 110 of FIGS. 2 and 3. FIG. 4 illustrates a nominal ring 300, with FIG. 5 illustrating an out of square ring 400. The nominal ring 300 has a uniform axial thickness 302, and each axial facing surface 304, 306 of the nominal ring is normal to the axis 308. In contrast to the nominal ring 300, the out of square ring 400 includes a varying thickness 402. The out of square ring 400 also includes an out of square surface 404 with the surface 404 having a kink angle 407 relative to the axis 408. The kink angle 407 is oblique to the axis 408, and is the result of the varying thickness 402.

By pairing the nominal ring 300 with the out of square ring 400, a two ring spacer is created that allows an average thickness to be controlled by selecting a desired nominal ring, and the average kink angle to be controlled by the out of square ring 400.

With continued reference to FIGS. 4 and 5, FIG. 6 illustrates another practical example rotor spacer 500. FIG. 7 illustrates an axial view of the spacer 500. The rotor spacer 500 includes two rings 502, 504 each of which includes an out of square surface 510, with the out of square surfaces 510 facing each other. In the example of FIGS. 6 and 7, the rings 502, 504 are identical. In addition, each ring 502, 504 includes a clocked position. In some examples, the clocked position can be indicated by a surface mark. In other examples, the clocked position is indicated by an indent, or other physical structure on each of the rings 502, 504. When the clocked positions are offset by 180 degrees, the total kink angle of the spacer 500 is minimized. In an example, such as FIG. 6, where the out of square surfaces are at identical angles, the total kink angle while 180 degrees offset is zero. The rotation of one ring relative to the other ring is referred to as the angular offset 520, 520', 520". In contrast, when the clocking positions 506 of the rings 502, 504 are aligned (e.g. have a zero degree angular offset), the kink angle is maximized and is a sum total of the kink angle of each ring 502, 504. Rotating the rings 502, 504 relative to each other does not alter the average thickness of the spacer 500, allowing the axial length that will be compensated for by the spacer 500 to remain fixed.

In another example, illustrated in FIG. 8, the rings 602, 604 are not identical, and the out of square surfaces 610 have different kink angles. In such an example, the range of possible kink angles can be changed by selecting a second ring 604 surface 610 with a desired kink angle, and the spacer itself is fine-tuned by rotating the rings 602, 604 relative to each other. As with the other examples, the maximum kink angle occurs when the clocking positions have an angular offset of 180 degrees.

In yet another example, the axial thickness of the multi-ring spacer can be further tuned by inclusion of an additional nominal thickness spacer ring, such as the ring 300 illustrated in FIG. 4. In such an example, the kink angle is controlled by the angular offset of the out of square rings, and the axial thickness of the spacer is the sum of the average axial length of the out of square rings and the axial length of the nominal ring.

While described herein with specific regards to a rotor stack spacer, it should be appreciated that the axial spacer can be applied in alternative positions within the gas turbine engine where two co-rotating components are interfaced.

With continued reference to each of FIGS. 6 and 8, the distinct rings of the multi-ring spacers are illustrated with an axial gap between the rings in order to separately illustrate the kink angle and grade of the corresponding rings. It is appreciated that in an assembled configuration the facing surfaces 510, 610 contact each other as in the example of FIG. 3.

With continued reference to the examples disclosed in FIGS. 2-8, an exemplary method for assembling a gas turbine engine includes initially installing a plurality of rotor stacks and defining a gap between a first rotor stack and a second rotor stack in the plurality of stacks. Measuring an average axial length of the gap and measuring an out of square angle of the gap. Once the axial length and out of square angle have been measured, a multi-ring rotor stack spacer is selected, and the out of square rings of the multi-ring spacer are angularly offset to match the kink angle of the measured gap kink angle. In some examples, a third nominal ring is added to increase the axial length of the multi-ring spacer. In yet further examples, the kink angle offset by angular deviation is the combined kink angle of the as-manufactured nominal spacer length and the as-manufactured turbine engine components being interfaced.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section and a turbine section, with at least one of said compressor section and said turbine section having a rotor with a rotor arm extending from a rotor body, and a rotor assembly arm together forming a portion of a rotor stack assembly; and
a multi-ring spacer positioned between facing surfaces on said rotor assembly arm and said rotor arm, with the multi-ring spacer having a first ring having a first clocking position, a first kink angle, and a first axial end surface having the first kink angle defined relative to a first axis defined by the first ring, a second ring having a second clocking position, a second kink angle, and a second axial end surface having the second kink angle defined relative to a second axis defined by the second ring, wherein a total kink angle of the multi-ring spacer is dependent on an angular deviation of the second clocking position relative to the first clocking position.

2. The gas turbine engine as set forth in claim 1, wherein the total kink angle is maximized at an angular deviation of 0 degrees, and the total kink angle is minimized at an angular deviation of 180 degrees.

3. The gas turbine engine as set forth in claim 1, wherein an average axial length of said first ring is identical to an average axial length of said second ring.

4. The gas turbine engine as set forth in claim 1, wherein each of said first ring and said second ring have different average axial lengths.

5. The gas turbine engine as set forth in claim 1, wherein the first angle and the second angle are identical.

6. The gas turbine engine as set forth in claim 1, wherein the first angle and the second angle are different.

* * * * *